US008605133B2

(12) United States Patent (10) Patent No.: US 8,605,133 B2
Lampotang et al. (45) Date of Patent: Dec. 10, 2013

(54) DISPLAY-BASED INTERACTIVE SIMULATION WITH DYNAMIC PANORAMA

(75) Inventors: Samsun Lampotang, Gainesville, FL (US); David Erik Lizdas, Gainesville, FL (US); John Joseph Tumino, New Port Richey, FL (US); Nikolaus Gravenstein, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 703 days.

(21) Appl. No.: 12/530,368

(22) PCT Filed: Jun. 27, 2008

(86) PCT No.: PCT/US2008/068580
§ 371 (c)(1),
(2), (4) Date: Mar. 8, 2010

(87) PCT Pub. No.: WO2009/003169
PCT Pub. Date: Dec. 31, 2008

(65) Prior Publication Data
US 2010/0157018 A1 Jun. 24, 2010

Related U.S. Application Data

(60) Provisional application No. 60/946,636, filed on Jun. 27, 2007.

(51) Int. Cl.
*H04N 7/00* (2011.01)
*G09B 9/00* (2006.01)
(52) U.S. Cl.
USPC ............................ 348/36; 703/6; 463/4; 463/5

(58) Field of Classification Search
USPC .................... 348/36, E7.001; 703/6; 463/4, 5; 345/960; 717/135
See application file for complete search history.

(56) References Cited

U.S. PATENT DOCUMENTS

| | | | | |
|---|---|---|---|---|
| 5,328,190 | A | * | 7/1994 | Dart et al. ...................... 273/358 |
| 6,356,297 | B1 | * | 3/2002 | Cheng et al. ...................... 348/36 |
| 6,721,952 | B1 | * | 4/2004 | Guedalia et al. ................. 725/38 |
| 7,130,447 | B2 | * | 10/2006 | Aughey et al. ................. 382/103 |
| 7,544,137 | B2 | * | 6/2009 | Richardson .................... 473/415 |
| 7,720,276 | B1 | * | 5/2010 | Korobkin ....................... 382/154 |
| 7,966,197 | B2 | * | 6/2011 | Bassez et al. ....................... 705/3 |
| 2003/0080963 | A1 | | 5/2003 | Van Hook et al. |
| 2003/0095338 | A1 | | 5/2003 | Singh et al. |
| 2004/0077393 | A1 | * | 4/2004 | Kim et al. .......................... 463/2 |
| 2004/0130525 | A1 | * | 7/2004 | Suchocki ......................... 345/156 |
| 2005/0005302 | A1 | * | 1/2005 | Zigmond et al. .............. 725/109 |
| 2005/0237324 | A1 | * | 10/2005 | Guhring .......................... 345/419 |

(Continued)

FOREIGN PATENT DOCUMENTS

KR 10-0653200 11/2006

*Primary Examiner* — Alina N. Boutah
(74) *Attorney, Agent, or Firm* — Saliwanchik, Lloyd & Eisenschenk

(57) ABSTRACT

The subject invention provides a panoramic, interactive, seamless, intuitive, high-resolution and yet extensive simulation tool capable of simulating dynamic events that alter the panoramic view in response to the user's actions or inaction. The dynamic panorama simulation can generate and display novel scenes that are not limited to static "canned" content that has been previously photographed, rendered, recorded, captured or filmed thus providing great flexibility, contextual authenticity and liveliness and, in some instances, unanticipated and surprising but accurate developments in the simulation.

24 Claims, 6 Drawing Sheets

(56) References Cited

U.S. PATENT DOCUMENTS

| | | |
|---|---|---|
| 2005/0267353 A1 | 12/2005 | Marquart et al. |
| 2005/0280706 A1* | 12/2005 | Jong ............................. 348/143 |
| 2006/0223637 A1* | 10/2006 | Rosenberg ...................... 463/47 |
| 2006/0267963 A1* | 11/2006 | Pryor ........................... 345/173 |
| 2006/0285636 A1* | 12/2006 | Razzano ......................... 378/38 |
| 2007/0122778 A1* | 5/2007 | Beitel et al. .................. 434/219 |
| 2007/0159527 A1 | 7/2007 | Kim et al. |
| 2007/0194171 A1* | 8/2007 | Diamandis et al. ............. 244/10 |
| 2008/0038702 A1* | 2/2008 | Choquet ........................ 434/260 |
| 2008/0076556 A1* | 3/2008 | Icart ............................. 463/32 |
| 2008/0147366 A1* | 6/2008 | Schutz et al. ..................... 703/8 |
| 2008/0186255 A1* | 8/2008 | Cohen et al. ...................... 345/8 |
| 2008/0206720 A1* | 8/2008 | Nelson ............................ 434/44 |
| 2010/0159434 A1* | 6/2010 | Lampotang et al. .......... 434/365 |
| 2011/0096144 A1* | 4/2011 | Pea et al. ........................ 348/36 |

* cited by examiner 501
503
502 Figure 4A

502

DISPLAY-BASED INTERACTIVE SIMULATION WITH DYNAMIC PANORAMA

CROSS-REFERENCE TO A RELATED APPLICATION

This application is a National Stage Application of International Application Number PCT/US2008/068580, filed Jun. 27, 2008; which claims the benefit of U.S. Provisional Application No. 60/946,636, filed Jun. 27, 2007, both of which are incorporated herein by reference in their entirety.

BACKGROUND

A simulation is an imitation of some real thing or process. Simulation can be used to show the unfolding and eventual real effects of alternative conditions and courses of action or inaction. Simulations are used in many contexts, including the modeling of natural or human systems, in order to gain (or provide) insight into their functioning. Contexts in which simulation is used include performance optimization of a wide range of technologies, safety engineering, testing, training and education.

A computer simulation is an attempt to model a real-life or hypothetical situation on a computer so that, among others, it can be studied to see how the system works. By changing variables, predictions may be made about the behavior of the system. Computer simulation is often used as an adjunct to, or substitution for, modeling systems for which simple closed form analytic solutions are not possible.

Simulation, particularly computer simulation, is often used in training. This includes the training of civilians as well as military personnel. This often occurs when it is prohibitively expensive or too dangerous to allow trainees to use real equipment in the real world. In such situations they spend time learning valuable lessons in a "safe" virtual environment. Often the convenience is to permit exploration, mistakes, and exposure to rare events during training for a safety-critical system.

For example, a flight simulator is used to train pilots on the ground. It permits a pilot to "crash" a simulated "aircraft" without harming the instructor, pilot and aircraft. Flight simulators are often used to train pilots to operate aircraft in extremely hazardous situations, such as landings with no engines, or complete electrical or hydraulic failures. The most advanced simulators have high-fidelity visual systems and hydraulic motion systems. The simulator is normally cheaper to operate than a real aircraft (fuel, wear and tear, removing aircraft from revenue generating service).

Bearing resemblance to flight simulators, marine simulators train a ship's personnel. Simulators like these are mostly used to simulate large or complex vessels, such as cruise ships, dredging ships, or submarines. They often consist of a replication of a ships' bridge, with operating console(s), and a number of screens on which the virtual surroundings are projected.

Strategy games—both traditional and modern—may be viewed as simulations of abstracted decision-making for the purpose of training military and political leaders. Many video games are also simulators.

Medical simulators are increasingly being developed and deployed to teach therapeutic and diagnostic procedures as well as medical concepts and decision making to personnel in the health professions. Simulators have been developed for training procedures ranging from the basics such as blood draw, to laparoscopic surgery and trauma care.

Some medical simulations are developed to be widely distributed (such as web-enabled simulations that can be viewed via standard web browsers) and can be interacted with using standard computer interfaces, such as the keyboard and mouse.

Computer simulations have the advantage of allowing a student to make judgments, and also to make errors and learn from these errors. The process of iterative learning through assessment, evaluation, decision making, and error correction creates a much stronger learning environment than passive instruction.

Thus, realistic interactive simulations can be an important tool for learning difficult, dangerous, rare or not currently accessible information. Simulations can be performed to learn a task, play a game, and even to take a tour of a particular location. One problem encountered in implementing display-based or screen based simulations is the ability to provide the desired information within the finite space of a display such as a computer screen. Some approaches involve using a coarse image resolution in order to provide an extensive environment on one screen. Another approach, when finer resolution is required and only a smaller portion of the environment can be displayed on the screen at a given time, involves splitting a representation of an entire environment into multiple graphical representations. Navigation between various windows of an environment that has been split into multiple graphical representations is generally required for simulating an extensive functional environment. Unfortunately, splitting a representation of an entire environment into multiple graphical representations may introduce the need for pull-down menus and navigation between the various windows that (a) reduce user friendliness of the graphical user interface, (b) interfere with the flow of the simulation, (c) interrupt the suspension of disbelief necessary for a user to get immersed in a simulation, and (d) degrade the user's perception of the spatial relationship between the different component views of the entire simulated system and interfere with situational awareness.

Alternatively, a collage or patchwork of graphics representing different parts of an environment has been crammed onto a single screen. Sometimes these disparate graphics may confusingly be at different scales or taken from different perspectives and viewing angles and rendered in different formats, potentially making it difficult for users to appreciate the position, size and appearance of the components relative to each other.

Accordingly, there is a need for a dynamic, interactive simulation system having excellent resolution and yet extensive scope and minimally interrupted suspension of disbelief.

BRIEF SUMMARY

The subject invention provides new and advantageous panoramic simulation systems. The present invention provides an interactive simulation environment capable of maintaining a user's perception of the spatial relationship between different component views of an entire simulation environment. In preferred embodiments described in more detail below, the panorama is interactive and dynamic. Advantageously, because of the unique design of this system it is possible to achieve excellent resolution of even small objects in a large field without the need for drop-down menus or other features that interfere with suspension of disbelief.

In various embodiments of the present invention, suspension of disbelief is facilitated by a photorealistic image compared to an image rendered from a 3-dimensional (3D) data set of, for example, an operating room. Additionally, these 3D data sets are time consuming to measure and model compared to the time it takes to photograph and stitch together a photorealistic panorama.

The environment of the simulation described herein is interactive such that objects and controls within the scene can be manipulated, adjusted, and modified. To enhance the interactive capabilities of the system and to facilitate detailed inspection or adjustment of controls, outputs, and objects, various points in the scene can be viewed at high resolution and in great detail by, for example, clicking on the item or by simply holding the cursor over the object.

Through techniques such as mathematical modeling, the panorama can be made dynamic and lively such that, for example, conditions and output variables depicted within the scene change over time as a result of the mathematical models and actions (or no actions) taken by the user of the simulation.

For example in a medical simulation, these mathematical models can include pharmacokinetic and pharmacodynamic models of drugs available in the simulation that in some instances make use of compartmental models.

To provide added liveliness in one implementation, users can opt to turn on an inter-patient variability feature in the simulation such that even if identical patient parameters, such as age, weight and gender are selected, and identical user interventions occur at exactly the same time in two consecutive simulation sessions, the resulting simulation output (in Willis of drug concentrations) and physiological outputs (such as blood pressure) will be different. This also ensures that users cannot learn to predict the response of the simulation even after extensive practice. Modeling parameters for a patient, such as drug clearance or volume of distribution, are usually provided as a range of values that is expressed as a mean and a standard deviation. When the mean value is used as the modeling parameter in traditional simulations, there is no variability in patient response once the demographic parameters of the patient have been selected. In one implementation (that is not restricted to the panoramic simulation), when the inter-patient variability feature is turned on, a parameter such as volume of distribution, is picked at random from within the range (or a narrower subset of the range) defined by the mean and the standard deviation for that parameter.

Specifically exemplified herein are panoramic simulations of a real-space environment based on an existing or hypothetical environment to be simulated, but virtual, schematic, and abstract environments are also contemplated. The panoramic views can have a cylindrical or part-spherical, including hemispherical, line-of-sight, or incorporate an entire sphere of viewing angles.

An environment to be simulated can be an actual, virtual, or hypothetical space. For example, for a medical simulation, the environment to be simulated can be based on an actual operating room or a proposed operating room layout. In addition, the proposed operating room layout can be provided in a photo-realistic, virtual, or abstract manner, or a combination thereof.

In one embodiment of the present invention, a display based simulation includes a panoramic image of an environment to be simulated to provide background for a simulation environment; and dynamic and/or interactive images superimposed on the panoramic image. In the event that the panoramic image is warped, the image should be de-warped before it is displayed to users. A de-warped displayed portion can be formed from a viewing portion of the panoramic image having the dynamic and/or interactive images super-imposed thereon.

At any time, only a portion of the panorama (i.e., the de-warped displayed portion) may be displayed on the computer monitor. Users control which part of the panorama is displayed on their computer monitor by panning right, left, up and down. The de-warped displayed portion can be adjusted by a panning tool such as a navigation bar or a click and drag function of a mouse or it could be adjusted by the program, e.g., when clicking on a shortcut button described later.

In another embodiment, the present invention provides methods for creating display-based simulations. The methods of the subject invention can comprise providing a panoramic image of an existing or hypothetical real-space or an abstracted, virtual, or schematic space; and providing dynamic and/or interactive graphics.

Specifically exemplified herein is a simulation of an operating room. This simulation is particularly useful for training healthcare professionals including physicians and nurses. This simulation can also be used by healthcare providers, hospital administrators, sales personnel and others who have an interest in gaining insight into the functioning of an operating room, for skills assessment and credentialing in the use of drugs or equipment and for orientation of new residents and newly hired personnel in healthcare and in industry. It will be clear, however, from the descriptions set forth herein that the simulations of the subject invention find application in a wide variety of settings including, but not limited to, flight training, military training, driver education, navigational instruction, and video, educational, and online games.

BRIEF DESCRIPTION OF THE DRAWINGS

FIGS. 4A and 4B show dynamic and/or interactive images of a simulation environment according to an embodiment of the present invention.

DETAILED DISCLOSURE

Figure 1A:
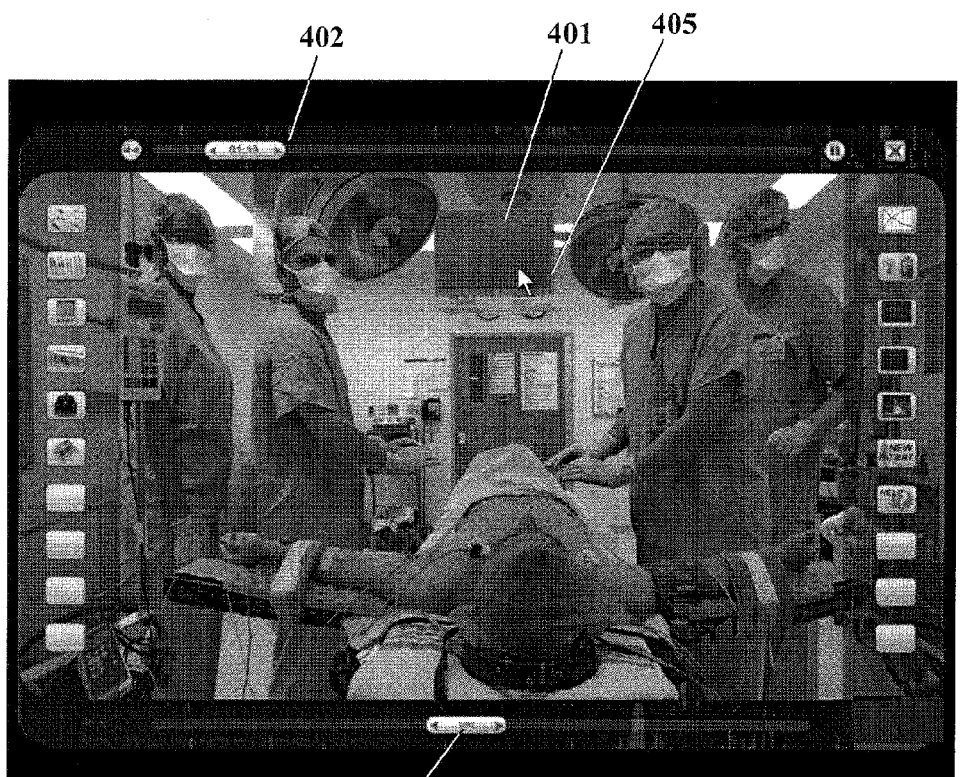
FIGS. 1A and 1B show display screens of a simulation environment according to an embodiment of the present invention.

The subject invention pertains to interactive simulations implemented via a dynamic panorama. The simulation environment can be provided on, for example, a 2-D screen or monitor. At any given moment, the monitor displays only a piece of the entire panoramic view of the simulated environment. However, the user can readily view the entire environment in 360° by simply palming in different directions. Additionally, the user can also view high resolution enlarged images of specific objects in the scene with an effect analogous to, and nearly as seamless as, stepping closer to an object.

Advantageously, the current invention provides simulations that are seamlessly continuous, smoother and more user-friendly than existing simulations. Also, navigation is simple, and situational awareness and context are enhanced.

In an embodiment specifically exemplified herein, the scene that forms the basis of the simulation environment is captured through a set of photographs preferably taken from the typical vantage point of the intended trainee, thereby generating a high-resolution scene while minimizing the need for time-consuming rendering and high end computers and graphics cards as would be the case for a 3D simulation. The photographs can be stitched together to create a 360° environment.

Advantageously the present invention can provide an interactive simulation environment capable of responding to dynamic situations (driven in some instances by mathematical models) and user interventions. Thus, in certain embodiments, the subject invention provides a simulation that reacts to a user's actions or inactions in a dynamically changing environment.

As noted above, the present invention uses a high resolution panoramic display where at any one time only a given portion of the simulated environment is displayed on the screen but a user of the simulation can pan left and right and up and down to obtain a seamless 360° view of the entire environment. The panoramic view can be cylindrical, part-spherical, or spherical.

In further embodiments, the simulation can incorporate multiple cylindrical, part-spherical, or spherical panoramic views and provide a means for moving between the different panoramic views. Thus, the simulation of the subject invention can include a path such as, for example, a corridor between panoramic views and, optionally, incorporating panoramic views at different points along the path through the corridor. Embodiments incorporating such an implementation are suited for wayfinding applications.

Different components within the panoramic display can be made interactive and user adjustable with, for example, a pointing device such as a mouse. In the operating room simulation, the interactive component may be, for example, an anesthesia machine or a ventilator. For smaller components, e.g., a vaporizer on an anesthesia machine, users can zoom in first onto the component so that there is sufficient visual and pointing device resolution before interacting with the simulated component.

Figure 1B:
Figure 2:
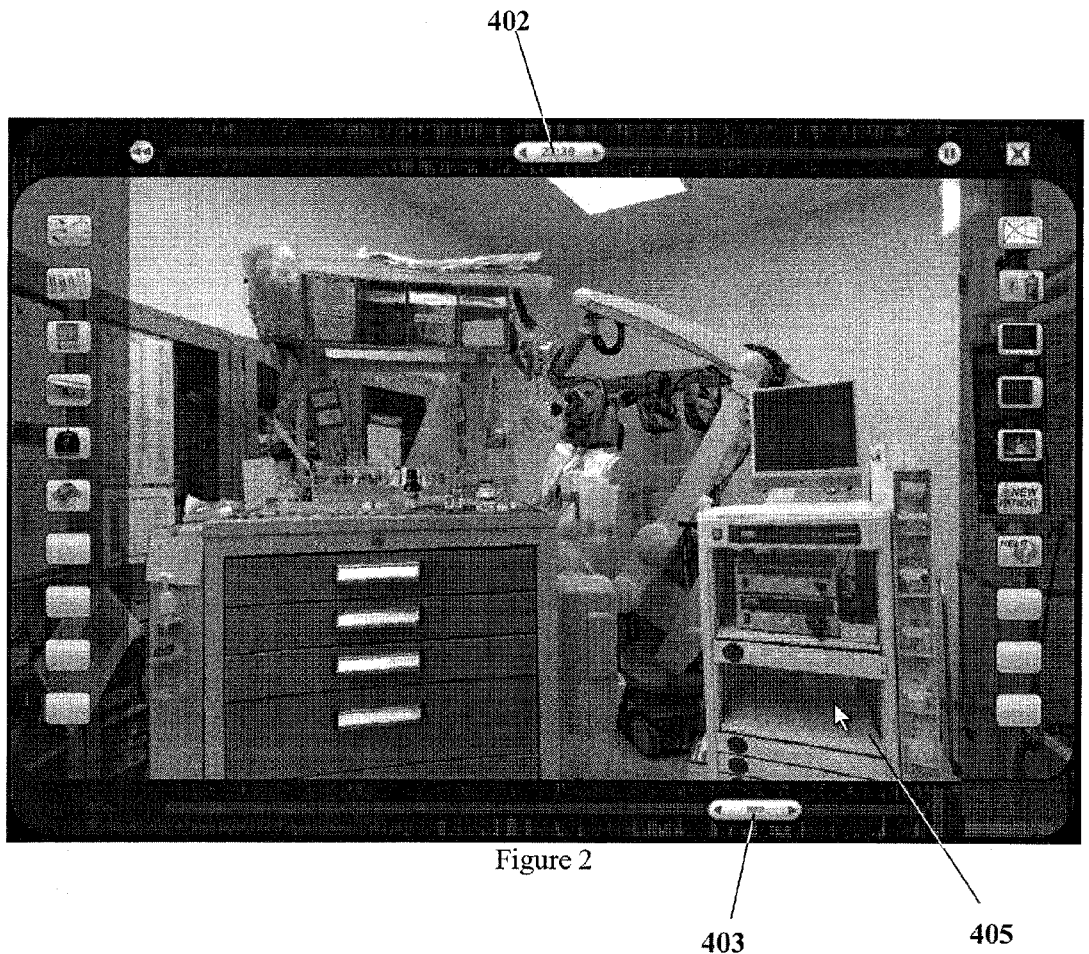
FIG. 2 shows a display screen of a simulation environment according to an embodiment of the present invention.

A simulation display according to the subject invention would typically include a user interface. The number of screens required to move about the display can be reduced by using various navigation tools. For example, a display can be panned around a panoramic image using tools such as a click and drag function of a mouse, one or more scroll bars, and/or shortcut buttons that can be selected for fast panning to a desired location. FIGS. 1A, 1B, and 2 show an example of a panning scroll bar as a panning tool that can be used in accordance with an embodiment of the present invention.

The interactive component allows modulation of objects and controls while moving within the environment. In this manner a large number of potential actions can be taken by the user of the simulation. For example, knobs can be turned, buttons pushed and other controls manipulated. Also, items can be moved or opened. As an example, a facemask image can be clicked and dragged from its resting place on the anesthesia machine to the face of the patient, and drawers on the anesthesia machine can be opened exposing the internal contents. In one embodiment a pointing device, such as a computer mouse, can be used for these manipulations and movements. Thus, a mouse interaction can be used to bring up a window with a close-up of the object or control, or information on the object or control.

In another embodiment, extra windows can be reduced or eliminated. For example, in one embodiment a mouse click can create a zooming effect to bring an item of interest to a closer view or to zoom out to a broader view. A zooming function (rather than the click of a mouse) can also be used to provide a close-up of an object or control.

The dynamic component allows for consequences of an action to unfold over time in the environment. In one embodiment, mathematical models can be used to modulate the environment based on particular actions or inactions. For example, in a medical situation, injecting a drug into a patient will have effects on that patient over time and in relation to other actions taken with that patient. It may take a certain amount of time for the drug to take effect, wear off, metabolize, etc. Embodiments of the subject simulation can utilize mathematical models to determine the amount of time for the drug to take effect, wear off, metabolize, etc. The dynamic component of embodiments of the present invention can adjust the environment in response to these and other types of effects. Dynamic images can include animations, including animated photographs, and videos. Videos can be accessed and then displayed while within a viewing window. The videos and animations can continue to run in the background of the simulation program as a function of time such that when a user returns to the image in the viewing window after performing a different task or jumping forward or backward in time, the video or animation is shown as it would appear at that time. In one embodiment using a video as one of the dynamic images, certain frames of the video depicting or associated with certain events can be tagged so that when the tagged frames are played during the simulation, the information in the tag is used to alter the simulation. For example, a video frame depicting an event associated with painful stimuli could have a tag attached to it that instructs the simulation to increase the heart rate of the patient by x % and the blood pressure by y %.

As another example of a dynamic image, a carbon dioxide monitor attached to a ventilator can be used to monitor carbon dioxide emissions from a patient. The monitor display can dynamically display the waveforms or provide numerical data that reflect the physiological status of the patient or the integrity of the anesthesia machine. In a specific embodiment, selected outputs from the mathematical models are plotted onto time plots of the desired variables. The time plots project the simulation into the future, for example, 3 hours from the present. The time plots also provide a means of visualizing what happened during a simulation and thus could be used for debriefing.

Figure 5:
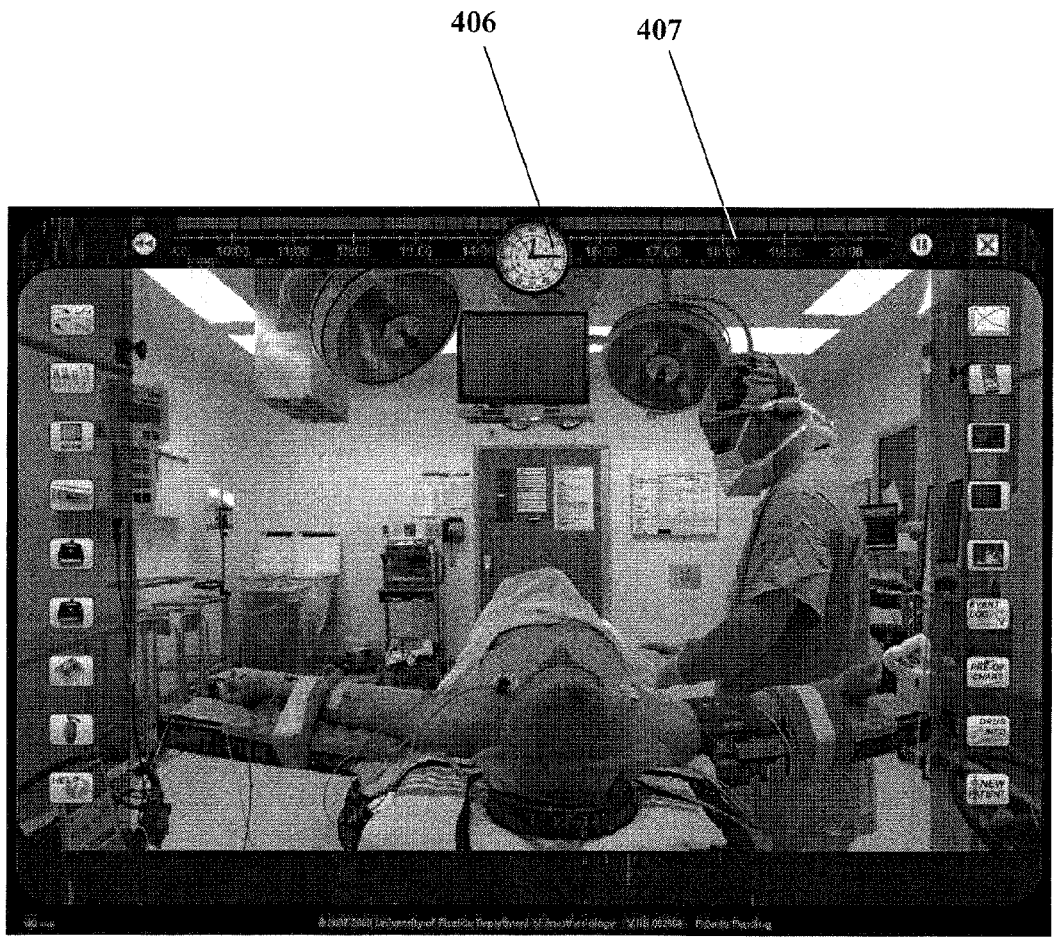
FIG. 5 shows a display screen of a simulation environment according to an embodiment of the present invention.

Users can employ time controls such as a time slider bar or a graduated time scale to jump forward or backward in time. FIGS. 1A, 1B, and 2 show an example of a slider bar as a time control tool on a viewing screen that can be used in accordance to an embodiment of the present invention. FIG. 5 shows an example of a graduated time scale as a time control tool on a viewing screen that can be used in accordance to an embodiment of the present invention.

All user actions can be logged in an event log. Users can use the event log or the time controls to go back to a previous action or decision. Users can take back an erroneous action through the event log by clicking on the entry for the erroneous action and then using the time controls to go back in time by a few seconds to delete the erroneous action and all user interventions that followed it. In essence, users are free to move in space and in time within the panoramic simulation.

Figure 3A:
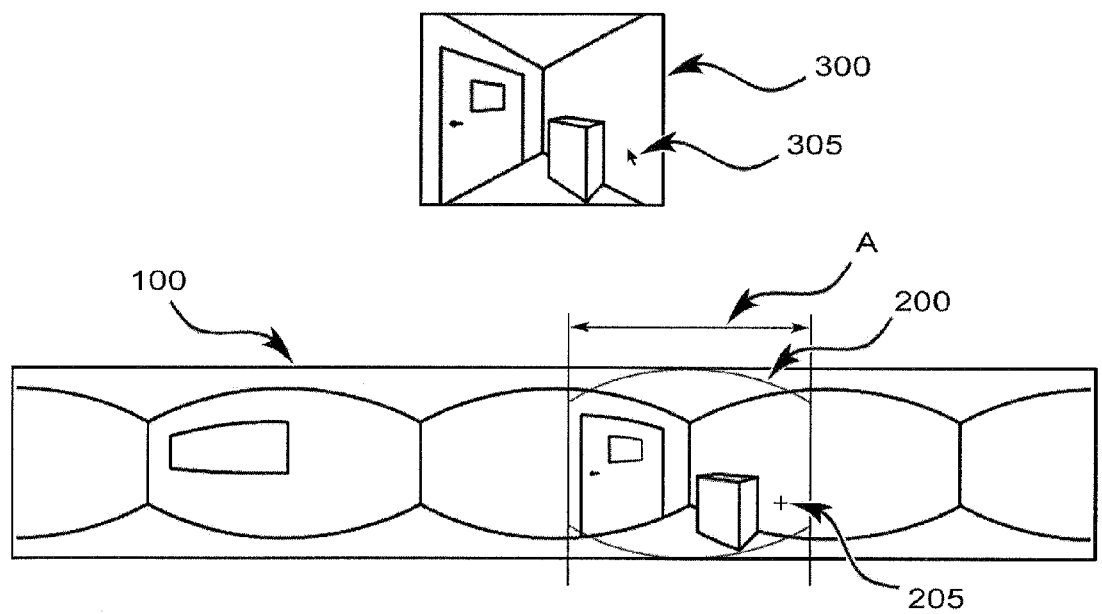
FIGS. 3A to 3D illustrate de-warping of a viewing portion of a simulation environment according to an embodiment of the present invention.
Figure 3B:
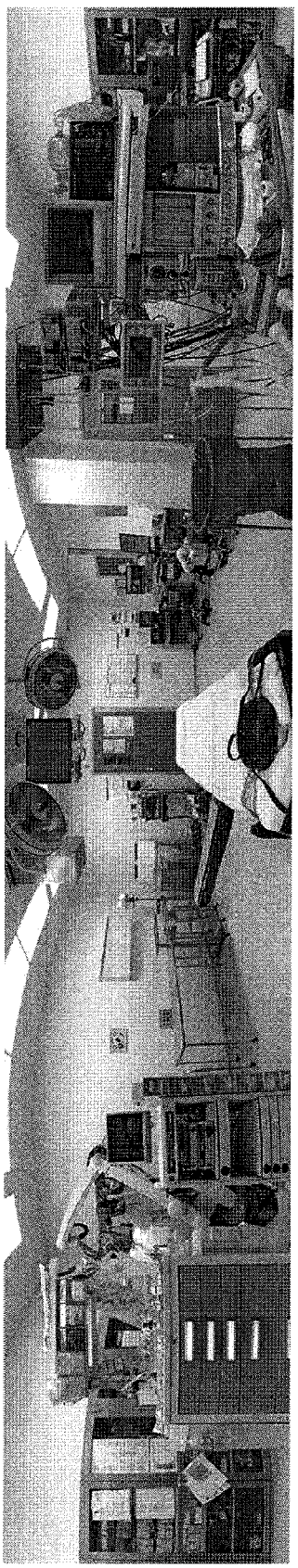
Figure 3D:
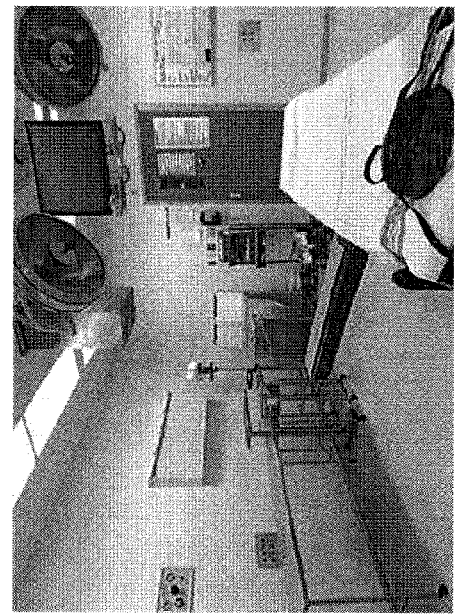
Figure 3C:
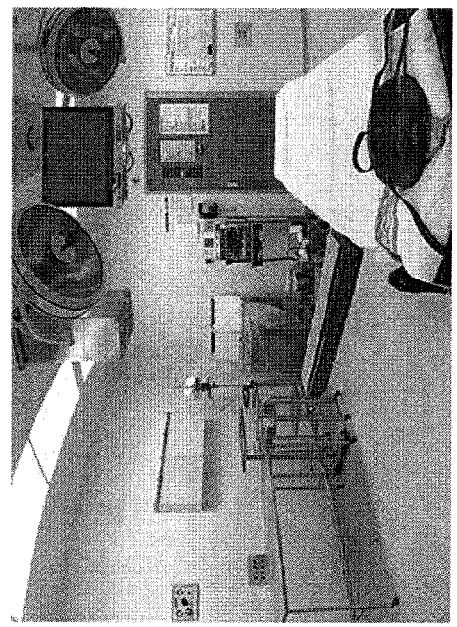

FIGS. 1A, 1B, 2, 4A, and 4B provide an illustrative embodiment of the present invention. FIGS. 3A-3D illustrate creating a de-warped viewing portion of a simulation environment. FIG. 3B shows a panorama 100 for the illustrative embodiment, FIG. 3C shows a viewing portion 200 of the panorama 100, and FIG. 3D shows a de-warped displayed portion 300. Here, a cylindrical panorama is used, where a user, in this case an anesthesia provider, is located at the center of the cylinder and rotates around and looks at the inside surface of the cylinder. The cylindrical panorama can be composed of a set of photographs stitched together. The panorama is stitched together with software known to those skilled in the art from a set of photographs taken, for example, at the typical vantage point of an anesthesia provider in an operating room. As shown in FIG. 3B, a stitched together panorama appears warped (for example, the straight lines for light panels in the ceiling are displayed as curved). This panorama is static, being a set of still images, and serves as the static background for the simulation (such as the portion shown in FIGS. 1A and 1B).

In one implementation, the background panorama is not static but changes to reflect actions taken by the user or the simulation that alter the layout in the environment that is being simulated. For example, IV poles, surgical drapes, and a varying number of surgical personnel can be introduced into the panoramic background at a given point in the simulated surgical procedure to provide cues about the progress of the case. Similarly, the user could drag an airway cart closer and the background panorama would change to indicate that the airway cart is now closer. In the same manner, users could open the drawers in the anesthesia cart or the storage cabinets along the back wall and the contents in the opened or exposed compartment would become visible and interactive.

The panorama created by a photographic image or images, especially when taken at a high resolution, is a large data file. For a real-time simulation, manipulating the whole panorama at a time may introduce perceptible delays that may detract from the simulation. In any event, a given computer monitor can only display a small part of the panorama. Referring to FIG. 3A, a viewing portion can be defined as an imaginary small rectangle A being moved over the panorama 100 which selects a portion of the panorama to be displayed to the user. The viewing portion is a part of the panorama 100 and like the panorama it is warped.

Figure 4B:
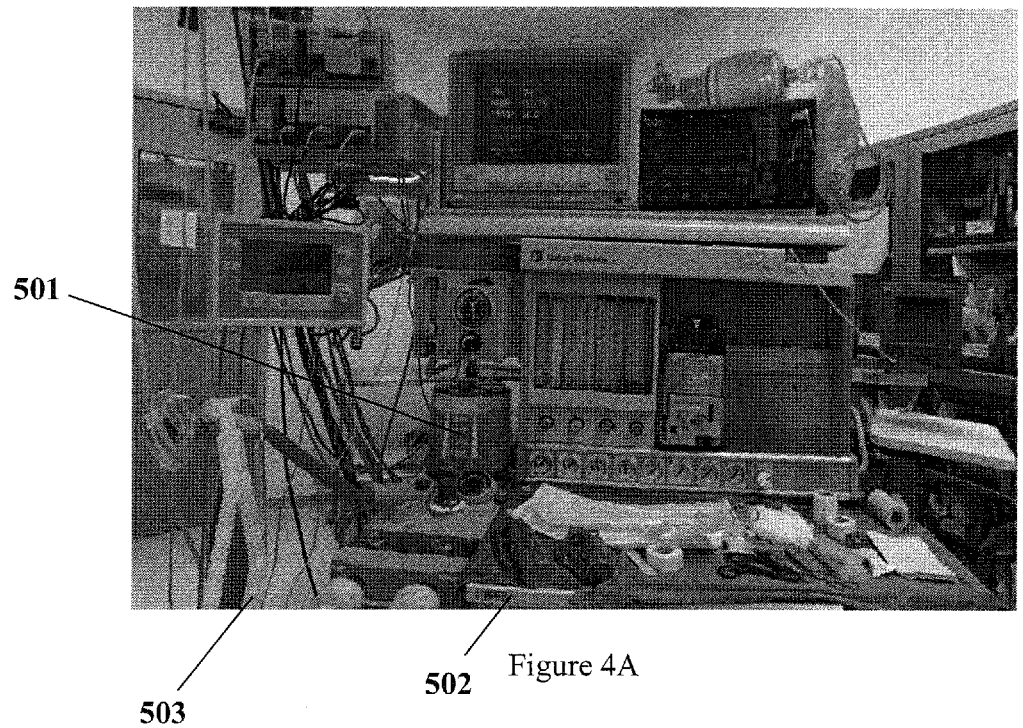
Figure 4B:
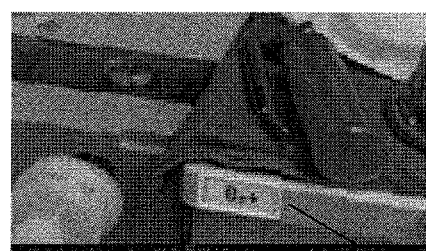

Next, warped dynamic and/or interactive images (icons, graphics, images, plots, photographs, videos, animations) are created and overlaid over the whole or a viewing portion of the panorama. These dynamic/interactive images are warped when overlaid over the panorama so that when a viewing portion of which they are part is de-warped, the overlaid interactive/dynamic graphics are de-warped and look normal. FIGS. 4A and 4B show examples of interactive and/or dynamic images. An example of a dynamic graphic is a ventilator bellows 501 moving up and down, when appropriate. The $O_2$ flush button 502 is an interactive image; it allows users to trigger an $O_2$ flush and fills the manual bag in some instances but the $O_2$ flush button 502 itself does not move and is thus not dynamic. The manual bag 503 is interactive and dynamic—it allows users to click on it to squeeze it and its shape and volume changes (dynamic graphic) to indicate the bag collapsing as a result of being squeezed and gas inside the bag being forced out.

Referring again to FIG. 3A, within the rectangular viewing portion A is an imaginary (or hidden) warped displayed portion 200 that has the shape of a football whose two pointy ends have been truncated, i.e., like a barrel. A de-warping algorithm is applied to the rectangular viewing portion. The de-warping algorithm can be used to aid suspension of disbelief. This de-warping algorithm maps the barrel shaped warped displayed portion (including the static portion of the panorama and the interactive and dynamic graphics) onto a rectangular de-warped displayed portion 300 that users actually see and think that they interact with.

According to embodiments of the present invention, the de-warping algorithm stretches portions of the warped image to different degrees based on the horizontal distance of that image portion from the vertical centerline of the image. In one embodiment, the de-warping mathematical relationship that determines the degree of stretching of different portions of the image based on horizontal distance from the vertical centerline is of an elliptical nature, but the equation can also be approximated by, for example, a square function for rapidity and ease of computation given that the de-warping has to occur in real time. FIGS. 3C and 3D show the effect of a de-warping algorithm according to an embodiment of the present invention. FIG. 3C contains a warped image, and FIG. 3D contains an image de-warped using an embodiment of the de-warping algorithm described above.

During a simulation, because a simulation display has removed warping, objects in the image tend to move over a range of areas from where they were originally imaged. In one embodiment, an icon image on a user's viewing screen can be correlated with elements of a warped picture.

A real cursor that users actually see and move around with their pointing device to "select" interactive graphics is present on the de-warped displayed portion 300. To a user's perspective, interaction occurs with the de-warped displayed portion that they see. According to one implementation, users are not directly interacting with the de-warped displayed portion 300. According to this implementation, the interactive graphics and layers that can tell from cursor position and mouse actions that a user wants to, for example, squeeze the bag are in the warped displayed portion. But this presents a problem because, for example, a cursor that appears to be placed on the ceiling-mounted monitor (an "interactive" graphic) in the de-warped displayed portion may actually be pointing to the ceiling (a non-interactive area) in the warped displayed portion. Thus clicking on the mouse based on the cursor position in the de-warped image would result in no action. As seen in FIGS. 1A and 1B, a region of interest, for example a video monitor 401, gets distorted as a user's perspective pans around the room, providing perspective and the sensation of depth even though the image is 2-dimensional.

To solve this discrepancy between the cursor position in the warped and de-warped displayed portions, a proxy cursor 205 (as shown in FIG. 3A) is created for the warped displayed portion 200. A warping algorithm, the reverse of the de-warping algorithm, is applied to the real cursor 305 position in the de-warped displayed portion 300 to generate the position of the proxy cursor 205 in the warped displayed portion 200. The position of the proxy cursor over interactive graphics in the warped displayed portion then dictates whether an interaction occurs. The pointing device commands (such as a mouse click) requested by a user are executed based on the mapped cursor position in the warped displayed portion 200. Interactive graphics can include the highlighted representation of interactive images, which are yet another layer.

A first layer of a simulation environment can be a panoramic image of the environment to be simulated (e.g., a photo realistic image or an abstract schematic image). The panorama does not need to be photo-realistic; it can be virtual, rendered, iconic or abstract like a transparent reality simulation, or a combination thereof. This layer forms the basis of the environment upon which interactive and dynamic layers may be imposed.

As described above, an environment to be simulated can be an actual, virtual, or hypothetical space. In addition, the environment to be simulated can be provided in a photo-realistic, virtual, or abstract manner, or a combination thereof.

The simulation-space does not require tedious and time-consuming precise 3D rendering of each detail of the environment to be simulated because an inexpensive and readily-available image capture tool (a digital camera with photo-stitching software) can be used.

In one embodiment, a display based interactive simulation can be created using images of an environment to be simulated. In one embodiment, an image can be taken of an existing real-space. A panoramic image of an environment can be obtained using, for example, video or still cameras. Separate images can be stitched together using photo-image techniques known to those skilled in the art. A second image (the one to be viewed) can be formed which removes any visible warping.

Interactive components of selected items in the image of the environment to be simulated can be created as images. Indicia that an image is interactive can be provided such that, for example, the indicia are available while a pointer or cursor is within the active area of that image. One such indicium can be an appearance of high-lighting of the image such as shown in FIGS. 1A and 2 where a cursor 405 is within the active area of the dynamic and/or interactive image.

One or more dynamic images can be superimposed or overlaid on the panoramic view. Therefore, in certain embodiments of the current invention, a display based interactive simulation is not only panoramic and interactive, but also capable of simulating dynamic events, e.g., the up and down movement of a ventilator bellows or the alteration of the shape of a capnogram to indicate a malfunction in the anesthesia machine.

In one embodiment, the dynamic regions can start moving as they enter or are about to enter the viewing portion so as to reduce the amount of processing power the simulation requires. Accordingly, mathematical models for dynamic events can continue to run, but the dynamic representations are not in motion if they are not in the viewing portion.

In certain embodiments, the simulation of the subject invention can provide "walkthroughs" that connect, for example, a plurality of panoramic scenes. The walkthroughs may, themselves, be a series of still photographs that have been stitched together to create a linear progression from one panoramic scene to another. The walking may also be achieved by "hopping" from one panoramic scene to another. Alternatively, a movie (or movies) can be used for the walkthrough. In any case, there can be branch points where the user can choose between different destinations.

FIGS. 1A, 1B, and 2 show an embodiment of a simulation display screen according to the subject invention. A top slider bar system can be included to indicate and control time. The slider 402 can display elapsed time and can move along the slider bar from left to right. In one embodiment, the elapsed time increments in 1 second intervals in real time, if the slider 402 is left alone. In one embodiment, the slider 402 can be clicked and dragged left to a desired time in the past to erase all events to the right of (after) the new slider position. This feature can be used for example to take back the last user intervention or all interventions in a certain time frame. The slider 402 can be clicked and dragged right to a desired time in the future to immediately observe the effects of an action or to avoid waiting for an event (e.g., intubation) to unfold in real time. In another embodiment, depicted in FIG. 5, a graduated time scale 407 can be clicked and dragged relative to a fixed point to adjust time.

A reset button (shown in the Figures as a double left arrow at the left of the time slider bar) can be included to allow the simulation to be reset. For example, the reset button can be used to start over fresh with a same patient. A pause/play toggle button (located at the right of the time slider bar) can be included to allow the simulation to be paused/resumed. Elapsed time stops incrementing when the simulation is paused and resumes incrementing when the simulation is resumed. FIG. 5 illustrates an alternative embodiment utilizing a graduated time scale 407 instead of a time slider bar to control time. With respect to the graduated time scale 407, a user can click and drag on the graduated time scale itself to adjust the simulation time. The hands of clock 406 can move forwards and backwards accordingly as the graduated time scale 407 is clicked and dragged.

Referring again to FIGS. 1A, 1B, and 2, a bottom slider bar system 403 can be used for panning the panoramic view (panorama) right or left. In another embodiment, a vertical slider bar system on a side of the viewing screen can be used for panning the panoramic view up or down. The panning speed can be proportional to the speed at which the slider is moved. If the slider is at the extreme right (or left) of the slider bar, holding a mouse down can be used to cause the panorama to pan to the right (or left). In an embodiment, panning the panorama can also be accomplished by directly clicking and dragging on the panorama itself in the desired direction and at the desired speed. This panning function is available for the simulation as shown in FIG. 5, which does not have a panning slider bar.

Embodiments of the subject invention can incorporate audio indicia of events. For example, in an operating room environment, audible pulse oximeter tones can change pitch, just like the real device, to indicate oxygen saturation changes based on a mathematical model. The audio cues can be directional when using a multi-speaker sound system. For example, when the pulse oximeter is to the right of the user, the beeping sound of the pulse oximeter comes from the right speaker. Similarly, the pulse oximeter sound can be provided equally from the front speakers in a surround sound system if the user is directly facing the pulse oximeter. In a particular implementation, the orientative audio cues can continue even with the source of the sound outside of the viewing screen.

Different areas of the panorama can be interactive, such as the vaporizer, drug cart and airway device cart. Referring to FIG. 2, interactive elements can be indicated by a highlighting when a cursor comes within the interactive area. In certain embodiments, interactive areas in the panorama have corresponding shortcut buttons.

One of the shortcut buttons can produce a menu of different package inserts for the drugs used in the simulation. In real life, package inserts are written on tiny pieces of paper inserted into the package containing the drug. As a result the font in the package insert is tiny and almost unreadable. There are indications that package inserts are not read by some healthcare providers. In the simulation, the package inserts can be reproduced electronically in large font that can be easily read and readily searched for key terms. For example, in the simulation, dosage information can be quickly located in the electronic version of the package insert by searching for the term "dose".

To make package inserts become alive, more engaging and useful (and thus used more often than is currently the case in real life), the simulation tracks the actions of users and can detect when a mistake (e.g., incorrect dose) is being made. If the mistake that is made within the context of the simulation (e.g., a pediatric, pregnant or elderly patient requiring a different dosage from a young adult) is addressed in the corresponding package insert, in one implementation, a warning appears and the user is directed to the relevant part in the package insert that addresses the correct dosage for the relevant context in that simulation. This is an example of an "intelligent tutor" imbedded in one implementation of the simulation that interacts with the user in a similar manner as a human tutor.

In a specific implementation, the simulation offers users a menu of different surgical cases of varying chronological duration. The menu of surgical cases can be varying and include information not typically included in single discipline simulations (such as for anesthesia providers). This is an example of a multi-disciplinary simulation that does not focus on only one (medical) discipline. The Institute of Medicine has advised that "Personnel that are expected to work as a team should train as a team." As a training tool, a simulation that provides a more global, multi-disciplinary perspective is more realistic and helps foster team training and spirit. Additionally, the video frames related to the surgical procedure can be tagged to indicate, for example, that a procedure is drawing to a close. That is, the video frames depicting a gall bladder being placed in a plastic bag and withdrawn from the body cavity would be tagged with information that the surgery is concluding and provides a situational context whereby the actions of the user may be viewed and assessed within that new context communicated to the simulation.

Another global application of the panoramic simulation derives from its extensive scope that provides a 360 degrees view of the entire operating room and all the devices, drugs and other materials used within. The panoramic simulation can be used as a modular framework whereby each and every component within the panoramic view (and its sub-sets such as opened drawers), and thus within the operating room or environment to be simulated, is eventually implemented as a simulation module, culminating in a complete virtual operating room or environment to be simulated.

By virtue of its encompassing nature, the panoramic simulation is also suited for simulation of processes. Taking the example of anesthesia in the operating room, the procedure to anesthetize a patient can be construed as a process that consists of knowing where things are, when and in what proper sequence to do certain actions, how much to give and contraindications among other considerations. Thus the panoramic approach can help with orientation and with process simulation.

In one embodiment of the simulation, the path followed by the cursor is tracked throughout the simulation. At the end of the simulation, the trajectory over the time of the cursor and how often it stayed over a particular location can be displayed as a "heat" map over the panoramic image to provide a cursor map that, when coupled with the event log, can provide insight into what the trainee was thinking and where most of the attention was focused.

Another shortcut button can provide the ability to review a pre-operative chart for the patient where the preoperative chart that is displayed is dependent on the surgical procedure that is selected by the user when the simulation is started. The event log can track among others whether the pre-op chart or package inserts were accessed and for what time duration.

All user interventions can be recorded in an event log. Another shortcut button provides access to an event log that can then be used for debriefing or for generating a score if the panoramic simulation is used as part of an educational game. In the event that the panoramic simulation is used through a web browser over the Internet, after individual log-in, individual user interventions can be recorded to a central database. This might be particularly useful for a multi-national corporation that may need to establish individual competence with sophisticated equipment or drugs for a worldwide customer base. Based on an individual user's preferences stored in a database, the panoramic background can be customized to national, regional or local language, customs, practices, conventions and standards such as medical gas color codes.

Many clinicians are blithely unaware of the cost of the choices that they make when caring for a patient. Also, a minute of operating room time can cost anywhere from $20 to $200 depending on location, staffing and equipment. To educate clinicians about the financial impact of their actions and unnecessary or avoidable delays, an implementation of the simulation has a "taxi meter" feature whereby the cost of every action (and time unit) is added to a running cumulative sum of money that can be displayed to the user in real time. In one embodiment of the simulation, time is assigned an adjustable monetary value for the taxi meter and for scoring in a game.

Embodiments of the present invention can use a panoramic or part panoramic view to provide a seamless, intuitive, interactive, high-resolution and yet extensive simulated environment for display based simulations. The display based simulations may be distributed, for example, using executable files that can be stored on a readable storage media such as on CDs. In addition, the display based simulations may be accessible via the web.

A "magic lens" is a tool that is used in mixed reality (a real environment mixed with a virtual environment) to overlay a schematic, abstract depiction. For example, the "magic lens" can be used to overlay a schematic, abstract depiction of an anesthesia machine over an actual, physical anesthesia machine. In another embodiment of the invention, a "magic lens" can be selected by the user and moved over specific portions of the panorama such that the photo-realistic rendering fades away and is replaced by a schematic abstract representation where, as an example, the plumbing of the anesthesia machine is rendered easy to visualize and flow of gas molecules in the anesthesia machines is made visible and can be color coded. Similarly moving "the magic lens" over different portions of the patient's body would bring up abstract schematic representations of the internal processes in the human body.

Although this disclosure describes embodiments of the present invention with respect to a medical simulation, embodiments are not limited thereto.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A non-transitory computer-readable medium storing code for controlling one or more processors to provide a display-based simulation, wherein the code includes instructions for:

executing the display-based simulation;

accessing a first image comprising a panoramic image of an environment to be simulated and dynamic and/or interactive images overlaying the panoramic image, wherein the dynamic and/or interactive images comprise elements of the panoramic image to be manipulated, modulated, and/or observed; and displaying a viewing portion of the first image while the display-based simulation is being executed, wherein a dynamic image of the dynamic images reflects consequences of an action taken by a user as the consequences occur over time in the simulation environment, the dynamic image using visual cues to reflect the consequences.

2. The medium according to claim 1, wherein the panoramic image comprises a set of photographs or images stitched together or a single photograph or image.

3. The medium according to claim 1, wherein the panoramic image comprises an abstract image or a schematic image.

4. The medium according to claim 1, wherein the panoramic image has warping and the dynamic and/or interactive images overlaying the panoramic image are warped corresponding to the warping of the panoramic image; and
wherein displaying the viewing portion of the first image comprises displaying a de-warped viewing portion to a user.

5. The medium according to claim 4, wherein displaying a de-warped viewing portion to the user comprises instructions for:
removing or reducing visible warping in the viewing portion of the first image to create a second image comprising de-warped dynamic and/or interactive images and a de-warped portion of the panoramic image, wherein the second image provides the de-warped viewing portion.

6. The medium according to claim 5, further comprising instructions for:
mapping the de-warped dynamic and/or interactive images of the second image to corresponding ones of the warped dynamic and/or interactive images of the first image; and
mapping the user's displayed cursor position in the second image to a corresponding cursor position in the first image.

7. The medium according to claim 6, further comprising instructions for:
executing any pointing device commands generated by the user based on the mapped cursor position in the first image.

8. The medium according to claim 1, further comprising instruction for:
displaying to a user indicia that a selected image of the dynamic and/or interactive images is interacted, wherein the indicia is available while a cursor is within an active area of the selected image.

9. The medium according to claim 1, further comprising instructions to provide audio cues to reflect the consequences of the action taken by the user.

10. The medium according to claim 9, wherein the instructions to provide audio cues comprise instructions to direct the audio cues to a particular audio output for orientated delivery of the audio cues.

11. The medium according to claim 1, wherein the dynamic images comprise animations, motion pictures, or a combination of animations and motion pictures, the computer-readable medium further comprising instructions for accessing and displaying the animations, motion pictures, or the combination of animations and motion pictures when the animations, motion pictures, or the combination of animations and motion pictures are in the viewing portion.

12. The medium according to claim 1, wherein the dynamic images comprise a video or a medical equipment data representation, the computer-readable medium further comprising instructions for accessing and displaying the video or the medical equipment data representation when the video or the medical equipment data representation is in the viewing portion.

13. The medium according to claim 12, wherein the video comprises frames, wherein certain frames of the video that are associated with predetermined events are tagged with a tag comprising information, the computer-readable medium further comprising instructions for:
altering the simulation based on the information in a tag when a tagged frame is played.

14. The medium according to claim 1, further comprising instructions utilizing mathematical models to modulate the dynamic and/or interactive images based on actions and inactions of a user.

15. A non-transitory computer-readable-medium storing code for controlling one or more processors to provide a display-based simulation, wherein the code includes instructions to:
execute the display-based simulation;
display a panoramic image, providing a background for a simulation environment of the display-based simulation;
display interactive images superimposed on regions of the panoramic image;
adjust a viewing portion of the panoramic image having the superimposed interactive images based on a defined area selected to be displayed to a user; and
display dynamic graphics superimposed on regions of the panoramic image, wherein the viewing portion is a viewing portion of the panoramic image having the superimposed interactive images and the dynamic graphics, wherein a dynamic image of the dynamic graphics reflects consequences of an action taken by the user as the consequences unfold over time in the simulation environment, the dynamic image using visual cues to reflect the consequences.

16. The medium according to claim 15, further comprising instructions to:
provide a panning tool for selecting the defined area to be displayed to the user.

17. The medium according to claim 15, further comprising instructions to display a zoomed-in image of a selected component of the panoramic image based on input from the user.

18. The medium according to claim 15, further comprising instructions utilizing mathematical models to modulate the simulation environment based on actions and inactions of the user.

19. A method for providing a simulation to a user of an electronic device having a display monitor and a pointing device, the method comprising:
displaying a viewing portion of a panoramic image providing a background for a simulation environment of the simulation; and
displaying dynamic and/or interactive images overlaid on regions of the panoramic image while the simulation is executing, wherein a dynamic image of the dynamic images reflects consequences of an action taken by a user as the consequences occur over time in the simulation environment, the dynamic image using visual cues to reflect the consequences.

20. The method according to claim 19, further comprising:
providing a panning tool for adjusting the viewing portion of the panoramic image having the overlaid dynamic and/or interactive images.

21. The method according to claim 19, further comprising:
animating the dynamic and/or interactive images available in the viewing portion in accordance with actions of a user or outputs of mathematical models for modulating the simulation environment based on actions and inactions of the user.

22. The method according to claim 19, wherein the displaying of the panoramic image and the dynamic and/or interactive images overlaying the panoramic image comprises displaying a de-warped viewing portion, the method further comprising:
   mapping a real cursor position in the de-warped viewing portion to a corresponding cursor position in a warped first image comprising the panoramic image and all overlaid interactive and/or dynamic images.

23. The method according to claim 22, further comprising:
   executing pointing device commands generated by the user based on the mapped cursor position in the warped first image.

24. The method according to claim 19, further comprising:
   displaying a time control tool for adjusting a point in time within the display-based simulation.

* * * * *

UNITED STATES PATENT AND TRADEMARK OFFICE
CERTIFICATE OF CORRECTION

PATENT NO. : 8,605,133 B2  Page 1 of 1
APPLICATION NO. : 12/530368
DATED : December 10, 2013
INVENTOR(S) : Lampotang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 894 days.

Signed and Sealed this
Twenty-second Day of September, 2015

Michelle K. Lee
*Director of the United States Patent and Trademark Office*